US012592651B2

(12) United States Patent
Miwa et al.

(10) Patent No.: US 12,592,651 B2
(45) Date of Patent: Mar. 31, 2026

(54) RECTIFIER CIRCUIT AND POWER SUPPLY USING SAME

(71) Applicant: Hitachi Power Semiconductor Device, Ltd., Ibaraki (JP)

(72) Inventors: Yoshihiro Miwa, Tokyo (JP); Hiroyuki Shoji, Tokyo (JP); Junichi Sakano, Tokyo (JP); Tomoyuki Utsumi, Hitachi (JP); Takahiro Higuchi, Hitachi (JP)

(73) Assignee: MINEBEA POWER SEMICONDUCTOR DEVICE INC., Ibaraki (JP)

( * ) Notice: Subject to any disclaimer, the term of this patent is extended or adjusted under 35 U.S.C. 154(b) by 117 days.

(21) Appl. No.: 18/682,514

(22) PCT Filed: Oct. 13, 2022

(86) PCT No.: PCT/JP2022/038143
§ 371 (c)(1),
(2) Date: Feb. 9, 2024

(87) PCT Pub. No.: WO2023/095478
PCT Pub. Date: Jun. 1, 2023

(65) Prior Publication Data
US 2024/0364231 A1 Oct. 31, 2024

(30) Foreign Application Priority Data

Nov. 24, 2021 (JP) ................................. 2021-190321

(51) Int. Cl.
*H02M 7/219* (2006.01)
*H02M 1/08* (2006.01)
*H02M 1/00* (2006.01)
(52) U.S. Cl.
CPC ............. *H02M 7/219* (2013.01); *H02M 1/08* (2013.01); *H02M 1/0048* (2021.05)

(58) Field of Classification Search
CPC .... H02M 7/217; H02M 7/219; H02M 7/2195; H02M 7/21; H02M 1/08; H02M 1/0048; Y02B 70/10
See application file for complete search history.

(56) References Cited

U.S. PATENT DOCUMENTS 9,729,081 B1 8/2017 Zou et al.
10,756,645 B1 8/2020 Chen
(Continued)

FOREIGN PATENT DOCUMENTS

CN 108616269 W 10/2018
CN 111726011 W 9/2020
(Continued)

OTHER PUBLICATIONS

International Search Report of PCT/JP2022/038143 dated Nov. 29, 2022.
(Continued)

*Primary Examiner* — Jue Zhang
*Assistant Examiner* — Jye-June Lee
(74) *Attorney, Agent, or Firm* — MATTINGLY & MALUR, PC

(57) ABSTRACT

A first MOSFET, a second MOSFET, a first control circuit, and a second control circuit are provided; the second MOSFET is in a non-rectification period when the first MOSFET is in a rectification period; the first MOSFET is in a non-rectification period when the second MOSFET is in a rectification period; the first control circuit outputs a voltage generated on the basis of a first input voltage as a first output voltage between the gate and the source of the first MOSFET in at least a portion of a period in which a voltage between the drain and the source of the second MOSFET is inputted as the first input voltage and a negative voltage is applied between the drain and the source of the first MOSFET; the (Continued)

second control circuit outputs a voltage generated on the basis of a second input voltage as a second output voltage between the gate and the source of the second MOSFET in at least a portion of a period in which a voltage between the drain and the source of the first MOSFET is inputted as the second input voltage and a negative voltage is applied between the drain and the source of the second MOSFET.

12 Claims, 7 Drawing Sheets

(56)                 References Cited

U.S. PATENT DOCUMENTS

| 10,784,794 | B2 * | 9/2020 | de Rooij | H02M 7/217 |
| 2010/0046259 | A1 * | 2/2010 | Ho | H02M 7/217 |
| | | | | 363/126 |
| 2012/0218797 | A1 | 8/2012 | Li et al. | |
| 2012/0242390 | A1 * | 9/2012 | Montalbo | H02M 7/219 |
| | | | | 257/676 |
| 2013/0077371 | A1 | 3/2013 | Liquicia et al. | |

| 2014/0177305 | A1 * | 6/2014 | Irish | H02M 7/219 |
| | | | | 363/127 |
| 2019/0044454 | A1 | 2/2019 | Gautier | |
| 2020/0220477 | A1 | 7/2020 | Chen et al. | |
| 2020/0287473 | A1 | 9/2020 | Granato et al. | |
| 2021/0111640 | A1 | 4/2021 | Heath et al. | |

FOREIGN PATENT DOCUMENTS

| JP | 2005-295627 | A | | 10/2005 | |
| JP | 2007020307 | A | * | 1/2007 | |
| JP | 2009-142001 | A | | 6/2009 | |
| JP | 2021-520774 | A | | 8/2021 | |
| WO | WO-2005124987 | A1 | * | 12/2005 | H02M 7/219 |
| WO | WO-2025164224 | A1 | * | 8/2025 | H02M 7/12 |

OTHER PUBLICATIONS

Extended European Search Report received in corresponding European Application No. 22898262.5 dated Oct. 15, 2025.
Japanese Office Action received in corresponding Japanese Application No. 2021-190321 dated Nov. 4, 2025.

* cited by examiner

RECTIFIER CIRCUIT AND POWER SUPPLY USING SAME

TECHNICAL FIELD

The present invention relates to structures of rectifier circuits and power supplies using the same, and particularly relates to effective techniques applicable to rectifier circuits for performing synchronous rectification using rectifying MOSFETs.

BACKGROUND ART

General rectifier circuits have employed synchronous rectification through diodes and MOSFETs, in order to rectify alternating currents to direct currents. Rectification using a diode has a problem of a larger loss due to the voltage drop caused by the built-in potential of the diode. On the other hand, synchronous rectification using a MOSFET induces a lower loss, since the MOSFET has no built-in potential and a forward current rises from 0 V. Therefore, in order to attain rectification with a lower loss, synchronous rectification with MOSFETs has been mainly utilized.

As a background art in the present technical field, for example, there is a technique as in PTL 1. PTL 1 discloses a rectifier circuit having a bridge structure for realizing synchronous rectification.

The rectifier circuit mainly includes rectifying MOSFETs and control circuits. The control circuits include a drive circuit for driving the rectifying MOSFET, a capacitor for supplying power to the drive circuit, a charging control circuit for controlling the charging of the capacitor, and a MOSFET inserted between the charging control circuit and a drain of the rectifying MOSFET (FIG. 5).

Further, PTL 2 discloses a rectifier circuit capable of achieving synchronous rectification without using a capacitor. In this rectifier circuit, the drain-source voltage of a rectifying MOSFET (233) is divided by resistances (171, 172), and the voltage resulted from the voltage division is inputted as a gate-source voltage of another rectifying MOSFET (183) having a source in common with the former rectifying MOSFET (233) (FIG. 2).

CITATION LIST

Patent Literatures

PTL 1: U.S. Pat. No. 10,756,645
PTL 2: JP 2005-295627 A

SUMMARY OF INVENTION

Technical Problem

In the rectifier circuit in PTL 1, the capacitor is charged using the voltage applied between the drain and the source of the rectifying MOSFET during off time-periods for the rectifying MOSFET, while a gate-source voltage of the rectifying MOSFET is generated using the voltage across the capacitor during on time periods for the rectifying MOSFET. Therefore, the capacitor is required to have a capacitance, in order that the capacitor holds a desired voltage during the time periods within which the capacitor is not charged. The volume of the power supply capacitor has hindered downsizing and cost reduction of the rectifier circuit.

In the rectifier circuit in Patent Document 2, the waveform of the gate-source voltage of the rectifying MOSFET (183) is a waveform resulted from the voltage division through the resistances, which is applied to the waveform of the drain-source voltage of the rectifying MOSFET (233). For example, in a case of rectifying a sinusoidal voltage, the gate-source voltage of the rectifying MOSFET (183) also has a sinusoidal shape, and the gate-source voltage raises and falls slowly, which has induced the problem of deterioration of the loss reduction effect of synchronous rectification.

For coping therewith, it is an object of the present invention to provide a rectifier circuit for performing synchronous rectification using rectifying MOSFETs, and a power supply using the same, such that the rectifier circuit enables reducing the capacitance and the volume of a capacitor which supplies power for controlling the rectifying MOSFETs while maintaining the loss reduction effect of the synchronous rectification.

Solution to Problem

In order to overcome the aforementioned problem, according to the present invention, there is provided a rectifier circuit including: a first MOSFET; a second MOSFET; a first control circuit; and a second control circuit, wherein the second MOSFET falls in a non-rectification time period when the first MOSFET falls in a rectification time period, and the first MOSFET falls in a non-rectification time period when the second MOSFET falls in a rectification time period, and during at least a part of a time period within which a voltage between a drain and a source of the second MOSFET is inputted as a first input voltage to the first control circuit, and a negative voltage is applied between a drain and a source of the first MOSFET, the first control circuit outputs a voltage generated based on the first input voltage, as a first output voltage, between a gate and the source of the first MOSFET, and during at least a part of a time period within which a voltage between the drain and the source of the first MOSFET is inputted as a second input voltage to the second control circuit, and a negative voltage is applied between the drain and the source of the second MOSFET, the second control circuit outputs a voltage generated based on the second input voltage, as a second output voltage, between a gate and the source of the second MOSFET, and the first control circuit clamps the first output voltage at a predetermined first threshold voltage when the first input voltage is a voltage equal to or larger than the first threshold voltage, and the second control circuit clamps the second output voltage at a predetermined second threshold voltage when the second input voltage is a voltage equal to or larger than the second threshold voltage.

Advantageous Effects of Invention

With the present invention, it is possible to provide a rectifier circuit for performing synchronous rectification using rectifying MOSFETs, and a power supply using the same, wherein the rectifier circuit enables reducing the capacitance and the volume of a capacitor which supplies power for controlling the rectifying MOSFETS while maintaining the loss reduction effect of the synchronous rectification.

Consequently, it is possible to achieve efficiency increase, downsizing, and cost reduction of the rectifier circuit and the power supply using the same.

Other problems, structures and effects than those described above will be clarified by the following description of embodiments.

DESCRIPTION OF EMBODIMENTS

Figure 1:
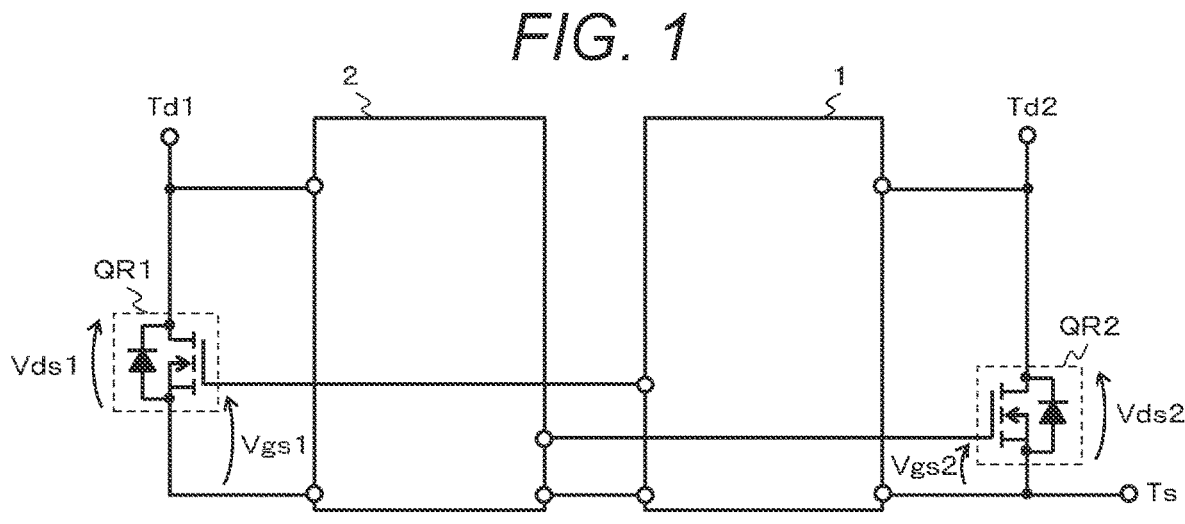
FIG. 1 is a view illustrating the structure of a rectifier circuit in a first embodiment of the present invention.

Hereinafter, embodiments of the present invention will be described with reference to the drawings. The same structures are denoted by the same reference numerals in the respective drawings and will not be described in detail redundantly.

First Embodiment

Figure 2:
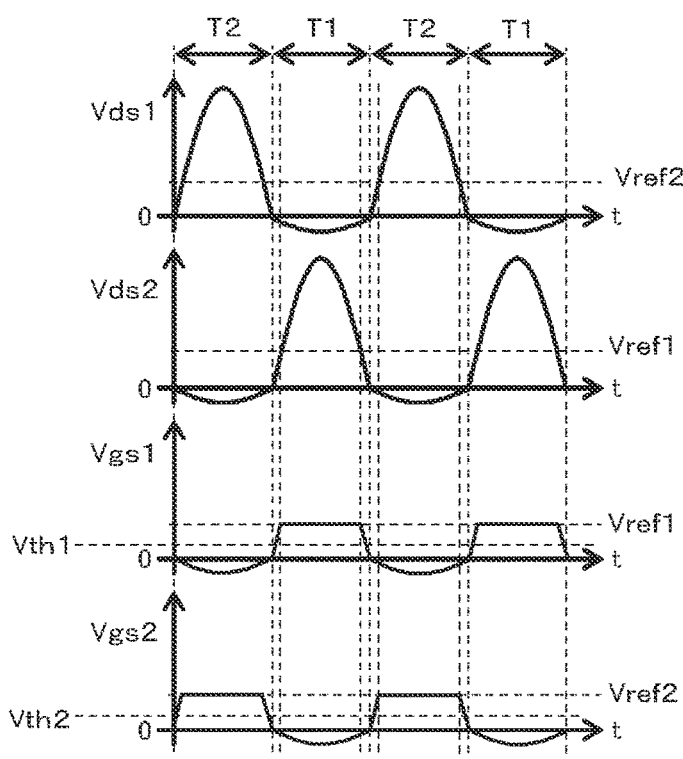
FIG. 2 is a diagram illustrating waveforms rectified by the rectifier circuit of FIG. 1.
Figure 3:
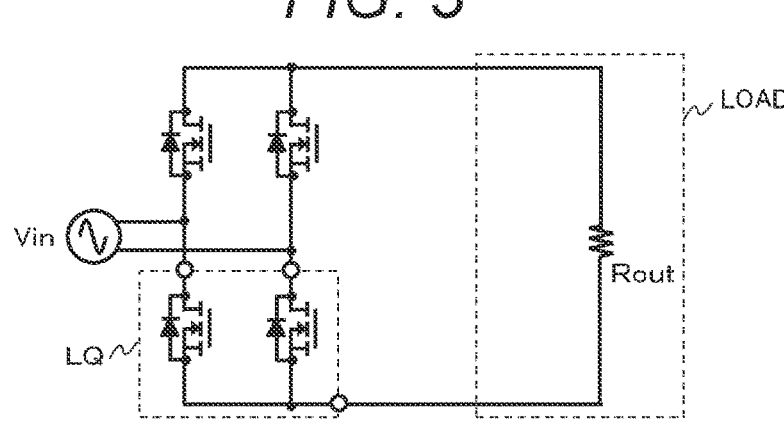
FIG. 3 is a view illustrating the structure of a rectification bridge to which the rectifier circuit of FIG. 1 is applied.

With reference to FIGS. 1 to 3 and FIGS. 11 to 14, there will be described the structure of a rectifier circuit in a first embodiment of the present invention, and a method for controlling the rectifier circuit. FIG. 1 is a view illustrating the structure of the rectifier circuit in the present embodiment, and FIG. 2 is a diagram illustrating rectified waveforms created by the rectifier circuit in FIG. 1. FIG. 3 is a view illustrating the structure of a rectification bridge to which the rectifier circuit of FIG. 1 is applied. Incidentally, FIGS. 11 to 14 are views illustrating the structure of a conventional rectifier circuit and waveforms rectified which are thereby, illustrated as a comparative embodiment for facilitating understanding of the structure according to the present invention.

First, the structure of the rectifier circuit in the present embodiment will be described with reference to FIG. 1. As illustrated in FIG. 1, the rectifier circuit in the present embodiment includes rectifying MOSFETs QR1 and QR2 (which may be simply referred to as QR1 and QR2 hereinafter), a control circuit 1 connected to a drain terminal and a source terminal of the rectifying MOSFET QR2 and to a gate terminal and a source terminal of the rectifying MOSFET QR1, and a control circuit 2 connected to a drain terminal and a source terminal of the rectifying MOSFET QR1 and to a gate terminal and a source terminal of the rectifying MOSFET QR2.

Note that, in FIG. 1, the rectifying MOSFET QR1 and the rectifying MOSFET QR2 are represented as enhancement type N-channel MOSFETs, taking, as an example, a case of applying them as two rectifying MOSFETs LQ in the low-side of the rectification bridge in FIG. 3.

The control circuit 1 receives a drain-source voltage Vds2 of the rectifying MOSFET QR2 as an input, and outputs a gate-source voltage Vgs1 of the rectifying MOSFET QR1. Further, the control circuit 2 receives a drain-source voltage Vds1 of the rectifying MOSFET QR1 as an input, and outputs a gate-source voltage Vgs2 of the rectifying MOSFET QR2.

Next, operations of the rectifier circuit in the present embodiment will be described with reference to FIG. 2. FIG. 2 illustrates voltage waveforms when the rectifier circuit of FIG. 1 is applied as the two rectifying MOSFETs LQ in the low-side of the rectification bridge of FIG. 3 and a sine wave voltage is applied thereto as an input voltage Vin. Time periods T1 are rectification time periods for the rectifying MOSFET QR1, and are non-rectification time periods for the rectifying MOSFET QR2. Further, time periods T2 are non-rectification time periods for the rectifying MOSFET QR1 and are rectification time periods for the rectifying MOSFET QR2.

In the rectification time periods T1 for QR1, the control circuit 1 receives, as an input, the drain-source voltage Vds2 applied to QR2, and outputs the gate-source voltage Vgs1 of QR1. At this time, when the input voltage is smaller than a predetermined threshold voltage Vref1, the control circuit 1 outputs the input voltage as the output voltage, and when the input voltage is equal to or larger than the threshold voltage Vref1, the control circuit 1 clamps the output voltage at the threshold voltage Vref1. Further, in the rectification time periods T2 for QR2, the control circuit 2 receives, as an input, the drain-source voltage Vds1 applied to QR1, and outputs the gate-source voltage Vgs2 of QR2. At this time, when the input voltage is smaller than a predetermined threshold voltage Vref2, the control circuit 2 outputs the input voltage as the output voltage, and when the input voltage is equal to or larger than the threshold voltage Vref2, the control circuit 2 clamps the output voltage at the threshold voltage Vref2. In this way, it is possible to prevent the gate-source voltages of QR1 and QR2 from becoming excessive.

The threshold voltages Vref1 and Vref2 for the control circuits 1 and 2 are larger than gate threshold voltages Vth1 and Vth2 of QR1 and QR2, respectively, in order to turn on QR1 and QR2, Further, these threshold voltages Vref1 and Vref2 are smaller than maximum gate-source voltage ratings of QR1 and QR2, respectively, in order to prevent failures of QR1 and QR2. Further, the output voltage from the control circuit 1 is a voltage lower than a maximum value of the voltage between the drain and the source of the rectifying MOSFET QR2, and the output voltage from the control circuit 2 is a voltage lower than a maximum value of the voltage between the drain and the source of the rectifying MOSFET QR1. In this way, synchronous rectification is realized.

Here, the aforementioned clamping refers to making the output voltage fall within a substantially constant range. For example, the clamping includes cases where the output voltage fluctuates due to noise mixed in the output voltage.

Conventional Embodiment 1

Here, the structure of a conventional rectifier circuit will be described with reference to FIG. 11. The rectifier circuit of FIG. 11 corresponds to the rectifier circuit in PTL 1 described above. The rectifier circuit of FIG. 11 includes rectifying MOSFETs QR1 and QR2, and control circuits CC1 and CC2. Further, the control circuits CC1 and CC2 include drive circuits CC12 and CC22, capacitors C1 and C2, charging control circuits CC13 and CC23, and MOS-FETs CC14 and CC24, respectively.

Figure 12:
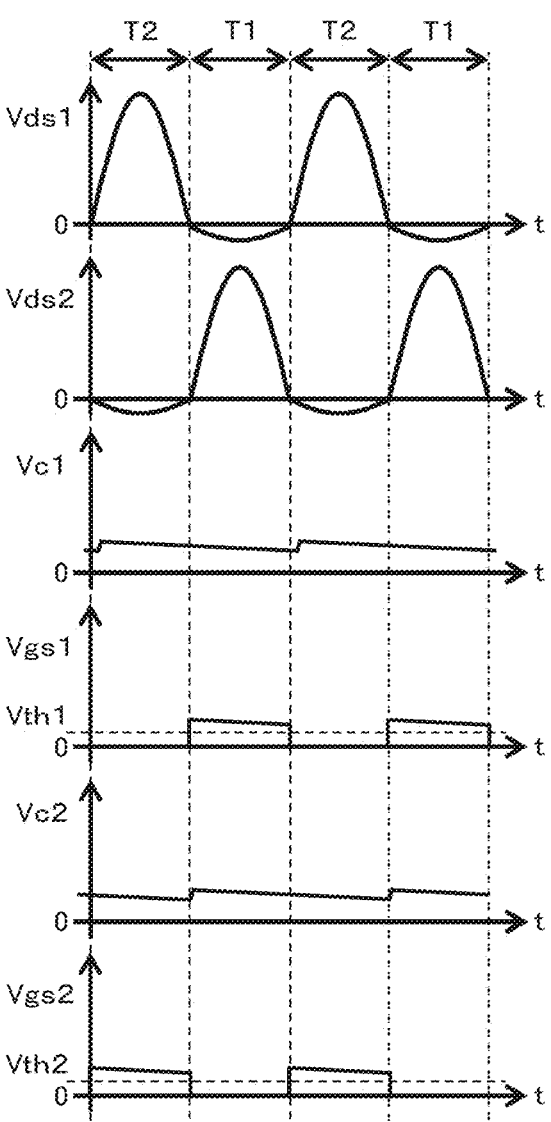
FIG. 12 is a diagram illustrating waveforms rectified by the rectifier circuit of FIG. 11.

Operations of the rectifier circuit of FIG. 11 will be described with reference to FIG. 12. FIG. 12 illustrates voltage waveforms when the rectifier circuit of FIG. 11 is applied as the two rectifying MOSFETS LQ in the low-side of the rectification bridge of FIG. 3, and a sine wave voltage is applied thereto as the input voltage Vin. Time periods T1 are rectification time periods for the rectifying MOSFET QR1, and are non-rectification time periods for the rectifying MOSFET QR2. Further, time periods T2 are non-rectification time periods for the rectifying MOSFET QR1 and are rectification time periods for the rectifying MOSFET QR2.

As an example, attention is focused on operations of QR1. First, in a time period T2, in the control circuit CC1, the capacitor C1 is charged by the input voltage Vin. By controlling the current for charging the capacitor C1 through the MOSFET CC14, the voltage VC1 across the capacitor C1 is controlled to be a voltage with a predetermined magnitude. Next, in a time period T1, the voltage VC1 across the capacitor C1 is outputted as the gate-source voltage Vgs1 of QR1.

Figures 10, 11:
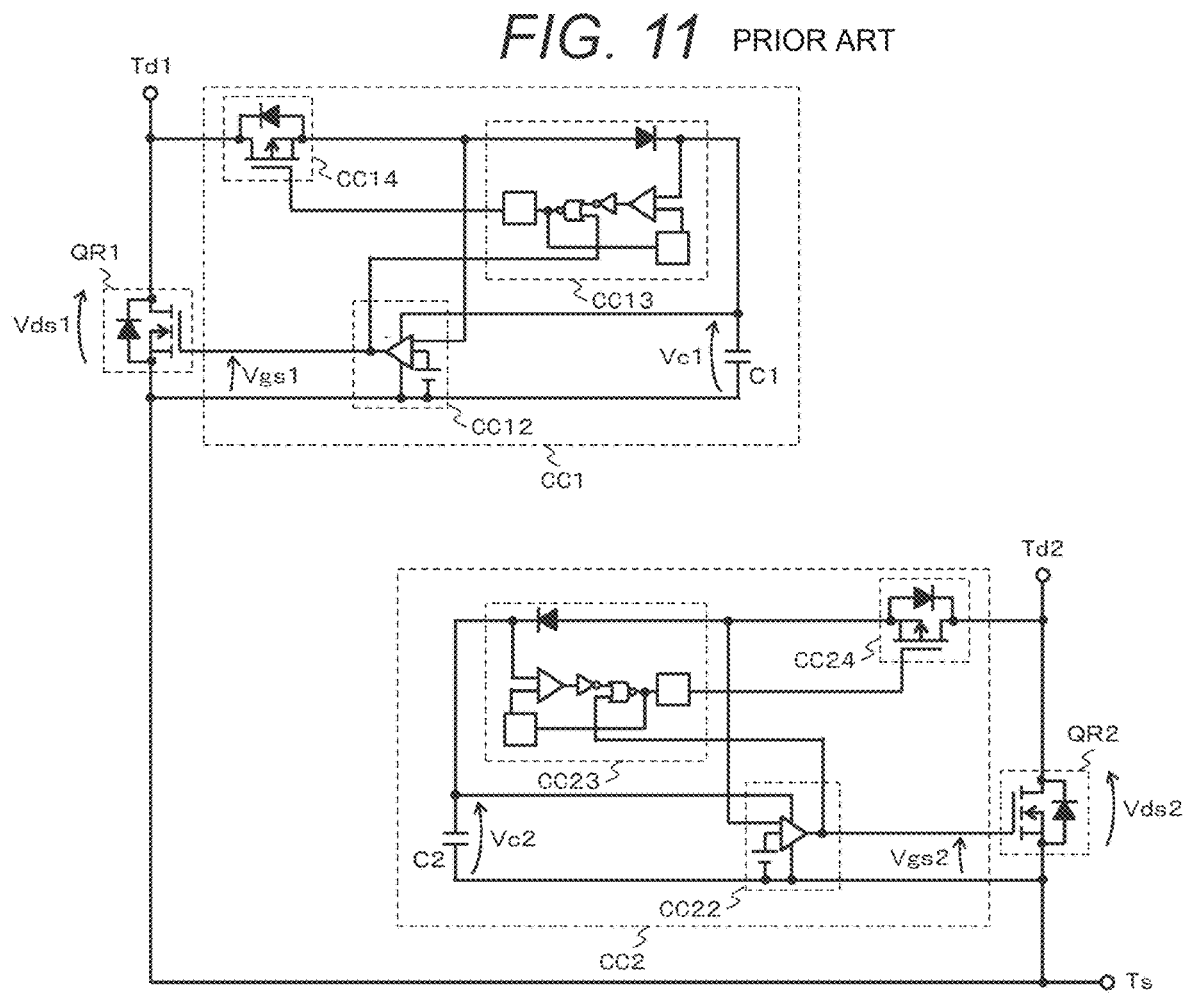
FIG. 10 is a view illustrating the structure of a front-end power supply in a sixth embodiment of the present invention.
FIG. 11 is a view illustrating the structure of a rectifier circuit in a comparative embodiment 1.

As described above, with the rectifier circuit illustrated in FIG. 11, it is necessary to accumulate the energy necessary for generating the gate-source voltages of the rectifying MOSFETs within the non-rectification time periods for the rectifying MOSFETs, which necessitates capacitors as energy accumulating elements.

On the other hand, in the rectifier circuit in the present embodiment illustrated in FIG. 1, the energy necessary for generating a gate-source voltage of a rectifying MOSFET is obtained from the input voltage Vin, by using, as the input voltage to the control circuit, the drain-source voltage of another rectifying MOSFET which falls in the non-rectification time periods when the former rectifying MOSFET falls in the rectification time periods. This enables reduction of the capacitances of the capacitors as compared with those of the conventional rectifier circuit illustrated in FIG. 11.

Conventional Embodiment 2

There will be described the structure of another conventional rectifier circuit, with reference to FIG. 13. The rectifier circuit of FIG. 13 corresponds to the rectifier circuit in PTL 2 described above. The rectifier circuit of FIG. 13 includes rectifying MOSFETs QR1 and QR2, and voltage-dividing resistances Rp1 to Rp4.

Operations of the rectifier circuit of FIG. 13 will be described with reference to FIG. 14. FIG. 14 illustrates voltage waveforms when the rectifier circuit of FIG. 13 is applied as the two rectifying MOSFETS LQ in the low-side of the rectification bridge of FIG. 3, and a sine wave voltage is applied thereto as the input voltage Vin. Time periods T1 are rectification time periods for the rectifying MOSFET QR1, and are non-rectification time periods for the rectifying MOSFET QR2. Further, time periods T2 are non-rectification time periods for the rectifying MOSFET QR1 and are rectification time periods for the rectifying MOSFET QR2.

As an example, attention is focused on operations of QR1. In the rectification time periods T1, the drain-source voltage Vds2 of QR2 is divided through the voltage dividing resistances Rp1 and Rp2, and the voltage generated across Rp2 is applied between the gate and the source of QR1. In FIG. 14, in the time periods T1, which are the rectification time periods for QR1, the waveform of the gate-source voltage Vgs1 of QR1 is a sine wave with an amplitude reduced by the voltage division by the resistances.

Figure 13:
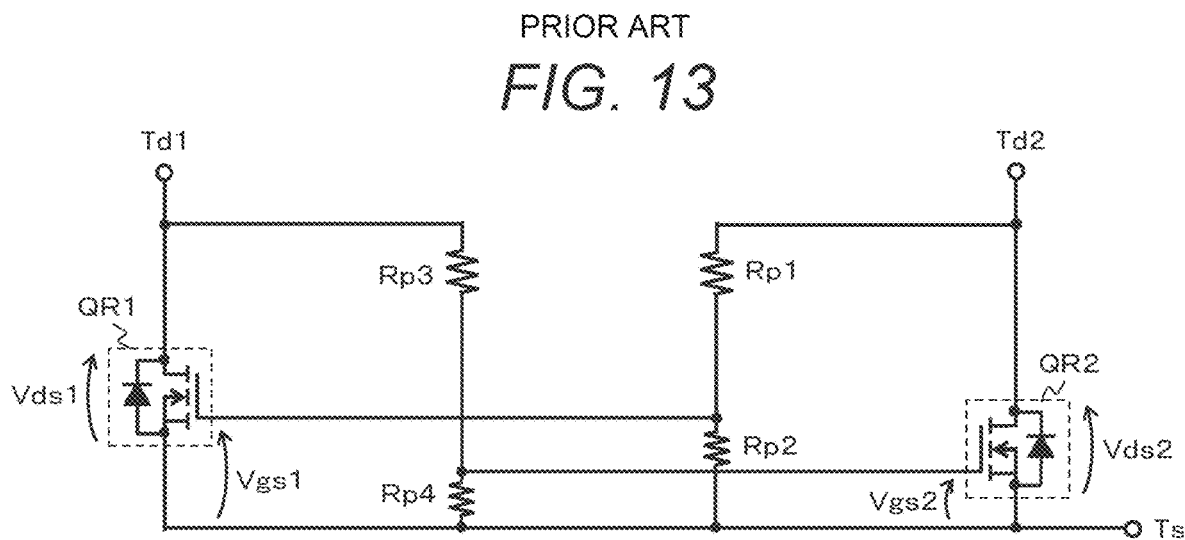
FIG. 13 is a view illustrating the structure of a rectifier circuit in a comparative embodiment 2.
Figure 14:
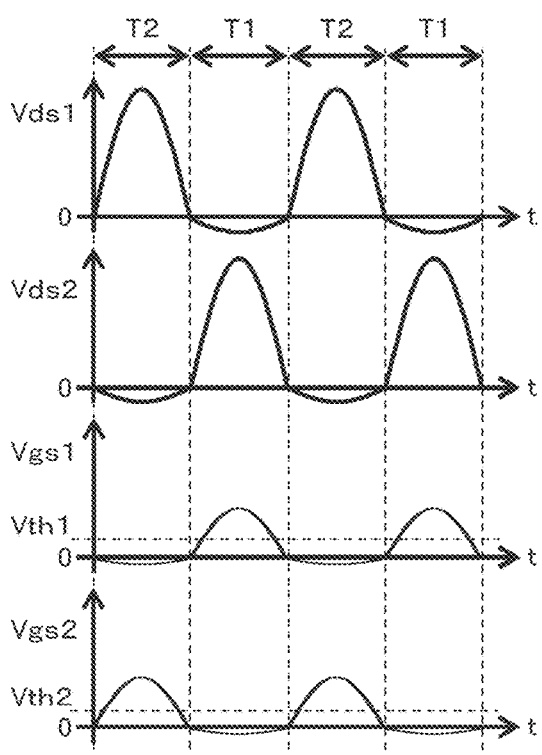
FIG. 14 is a diagram illustrating waveforms rectified by the rectifier circuit of FIG. 13.

As described above, with the rectifier circuit illustrated in FIG. 13, since the gate-source voltage of the rectifying MOSFET which is generated in the rectification time periods is a sine wave with an amplitude reduced by the voltage division by the resistances. This increases the time period from the start of a rectification time period until the gate-source voltage Vgs1, Vgs2 gets larger than the gate threshold voltage Vth1, Vth2 of the rectifying MOSFET QR1, QR2, and the time period from when the gate-source voltage Vgs1, Vgs2 gets smaller than the gate threshold voltage Vth1, Vth2 of the rectifying MOSFET QR1, QR2 until the end of the rectification time period. Namely, the gate-source voltages Vgs1 and Vgs2 rise and fall slowly. This results in reduction of the proportion of the time period during which each rectifying MOSFET is on to a rectification time period, which deteriorates the loss reduction effect of synchronous rectification.

On the other hand, in the rectifier circuit in the present embodiment illustrated in FIG. 1, when each input voltage is smaller than the threshold voltage Vref1, Vref2, the control circuit 1, 2 outputs the input voltage as it is as the output voltage, without decreasing the input voltage through voltage division by resistances (in this case, voltage drops caused by resistance components of switches being in the ON states and resistance components of wirings in the control circuit are not regarded as being caused by voltage division through resistances). Namely, the gate-source voltages in the rectifier circuit of FIG. 1 rise and fall more quickly than those in the rectifier circuit of FIG. 13. This results in an increase of the proportion of the time period during which each rectifying MOSFET is on to a rectification time period, which enhances the loss reduction effect of synchronous rectification.

As described above, with the rectifier circuit in the present embodiment, it is possible to eliminate capacitors for supplying power for controlling the rectifying MOSFETs, while maintaining the loss reduction effect of synchronous rectification.

Second Embodiment

Figure 4:
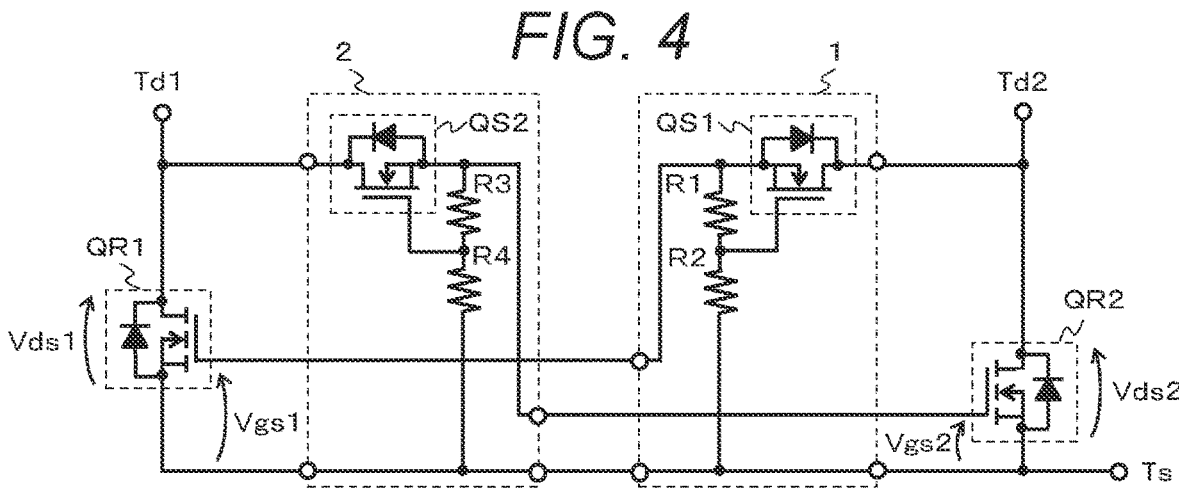
FIG. 4 is a view illustrating the structure of a rectifier circuit in a second embodiment of the present invention.

With reference to FIG. 4, there will be described the structure of a rectifier circuit in a second embodiment of the present invention, and a method for controlling the rectifier circuit. The present embodiment is an embodiment of a more specific circuit structure in the first embodiment.

As illustrated in FIG. 4, the rectifier circuit in the present embodiment includes rectifying MOSFETs QR1 and QR2, a control circuit 1 connected to a drain terminal and a source terminal of the rectifying MOSFET QR2 and to a gate terminal and a source terminal of the rectifying MOSFET QR1, and a control circuit 2 connected to a drain terminal and a source terminal of the rectifying MOSFET QR1 and to a gate terminal and a source terminal of the rectifying MOSFET QR2.

The control circuit 1 includes a depression type N-channel MOSFET QS1 having a drain terminal connected to the drain terminal of the rectifying MOSFET QR2 and a source terminal connected to the gate terminal of the rectifying MOSFET QR1, a voltage-dividing resistance R1 connected between the gate terminal and the source terminal of the N-channel MOSFET QS1, and a voltage-dividing resistance R2 connected between the source terminal of the rectifying MOSFET QR1 and the gate terminal of the N-channel MOSFET QS1.

Further, the control circuit 2 includes a depression type N-channel MOSFET QS2 having a drain terminal connected to the drain terminal of the rectifying MOSFET QR1 and a source terminal connected to the gate terminal of the rectifying MOSFET QR2, a voltage-dividing resistance R3 connected between the source terminal and the gate terminal of the N-channel MOSFET QS2, and a voltage-dividing resistance R4 connected between the gate terminal of the N-channel MOSFET QS2 and the source terminal of the rectifying MOSFET QR2.

The rectifying MOSFETs QR1 and QR2 are N-channel MOSFETs having respective sources connected to a DC low-voltage terminal.

The control circuit 1 and the control circuit 2 respectively include a MOSFET QS1 for controlling an output voltage based on the drain-source voltage $Vds2$ of the rectifying MOSFET QR2, which is the input voltage to the control circuit 1, and a depression type N-channel MOSFET QS1, QS2 as a switch for controlling an output voltage based on the drain-source voltage $Vds1$ of the rectifying MOSFET QR1, which is the input voltage to the control circuit 2.

A method for determining the threshold voltages Vref1 and Vref2 will be described. As an example, a method for determining the threshold voltage Vref1 will be described. Incidentally, it is assumed that the gate threshold voltage of the MOSFET QS1 is $Vth11$, the on-resistance value of the MOSFET QS1 is $rqs1$, and the resistance values of the resistance R1 and the resistance R2 are $r1$ and $r2$, respectively. When the input voltage to the control circuit 1, namely the drain-source voltage $Vds2$ of the rectifying MOSFET QR2 is 0, the gate-source voltage of the MOSFET QS1 is 0, and the MOSFET QS1 is on since the MOSFET QS1 is a depression type N-channel MOSFET. Thereafter, when $Vds2$ is increased, the current flowing from the drain of the MOSFET QS1 to the source thereof is increased. At this time, a voltage of $Vds2 \times (r1+r2)/(r1+r2+rqs1)$ is outputted as the output voltage from the control circuit 1, as the gate-source voltage of the MOSFET QR1. Therefore, by selecting the MOSFET QS1 and the resistances R1 and R2 such that the values of $r1$ and $r1$ are sufficiently larger than $rqs1$, it is possible to approximate the drain-source voltage $Vds2$ of the rectifying MOSFET QR2, which is the input voltage to the control circuit 1, and the gate-source voltage of the rectifying MOSFET QR1, which is the output voltage from the control circuit 1, to the same value.

When the drain-source voltage $Vds2$ of the rectifying MOSFET QR2 is increased, the current flowing from the drain of the MOSFET QS1 to the source thereof is increased, but the voltage drop caused across the resistance R1 is increased, which decreases the gate-source voltage of the MOSFET QS1 (since it is a negative voltage, the absolute value thereof increases by an amount corresponding to the voltage drop caused across the resistance R1), thereby increasing the on-resistance of QS1. As a result, when the drain-source voltage $Vds2$ of the MOSFET QS2 is equal to or larger than a certain voltage, the current flowing from the drain of the MOSFET QS1 to the source thereof has a certain constant value.

At this time, the voltage drop caused across the resistance R1 and the voltage drop caused across the resistance R2 are constant and, therefore, the gate-source voltage $Vgs1$ of the rectifying MOSFET QR1 is the sum of the voltage drop across the resistance R1 and the voltage drop across the resistance R2, which is constant. The constant voltage at this time is the threshold voltage Vref1 of the control circuit 1.

The threshold voltage Vref1 can be approximated to $Vth11 \times (r1+r2)/r1$. In order to obtain a desired threshold voltage Vref1, the gate threshold voltage $Vth11$ of the MOSFET QS1 and the resistance values $r1$ and $r2$ of the resistances R1 and R2 may be selected. The threshold voltage Vref2 can be similarly determined.

Third Embodiment

Figure 5:
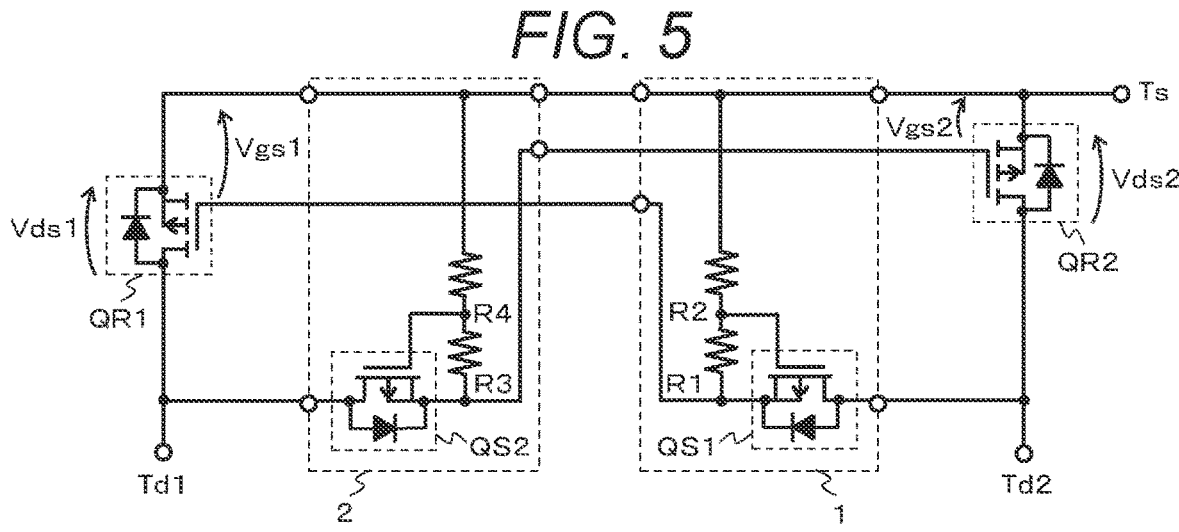
FIG. 5 is a view illustrating the structure of a rectifier circuit in a third embodiment of the present invention.
Figure 6:
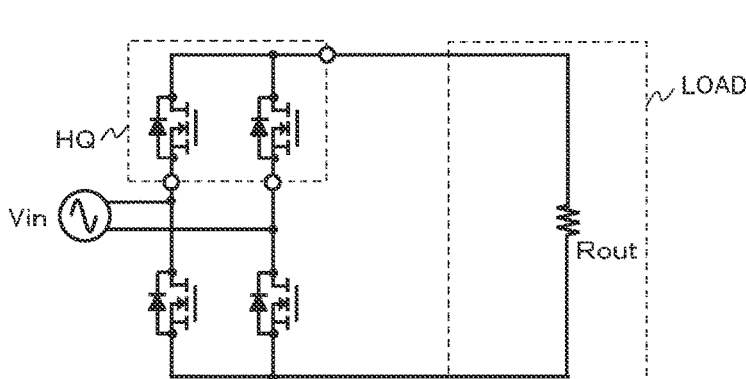
FIG. 6 is a view illustrating the structure of a rectification bridge in the third embodiment of the present invention.

With reference to FIGS. 5 and 6, there will be described the structure of a rectifier circuit in a third embodiment of the present invention, and a method for controlling the rectifier circuit. As illustrated in FIG. 5, the rectifier circuit in the present embodiment includes enhancement type P-channel MOSFETs as rectifying MOSFETs QR1 and QR2, and depression type P-channel MOSFETs as MOSFETs QS1 and QS2.

In the rectifier circuits in the first embodiment (FIG. 1) and the second embodiment (FIG. 4), the rectifying MOSFETs QR1 and QR2 are constituted by enhancement type N-channel MOSFETs, and QR1 and QR2 are provided with a common source terminal. Therefore, the rectifier circuits in FIGS. 1 and 4 cannot be applied as two rectifying MOSFETs HQ in the high-side, which are not provided with a common source terminal, in a rectification bridge constituted by four enhancement type N-channel MOSFETs as illustrated FIG. 6.

For coping therewith, in the rectifier circuit in the present embodiment illustrated in FIG. 5, enhancement type P-channel MOSFETs are used as QR1 and QR2, which enables providing QR1 and QR2 with a common source-side terminal even when they are applied as the two rectifying MOSFETS HQ in the high-side in FIG. 6.

The rectifying MOSFETs QR1 and QR2 are constituted by P-channel MOSFETs having respective sources connected to a DC high-voltage terminal. Further, the MOSFETs QS1 and QS2 are constituted by depression type P-channel MOSFETs.

With the structure of the rectifier circuit in the present embodiment, this rectifier circuit can be applied as a rectifier circuit in a high-side of a rectification bridge.

Further, in the structure of the rectification bridge illustrated in FIG. 6, N-channel MOSFETs having respective sources connected to a DC low-voltage terminal may be used as the rectifying MOSFETs QR1 and QR2 in the DC low-voltage terminal side, while P-channel MOSFETs having respective sources connected to the DC high-voltage terminal may be used as the rectifying MOSFETs QR1 and QR2 in the DC high-voltage terminal side.

Fourth Embodiment

Figure 7:
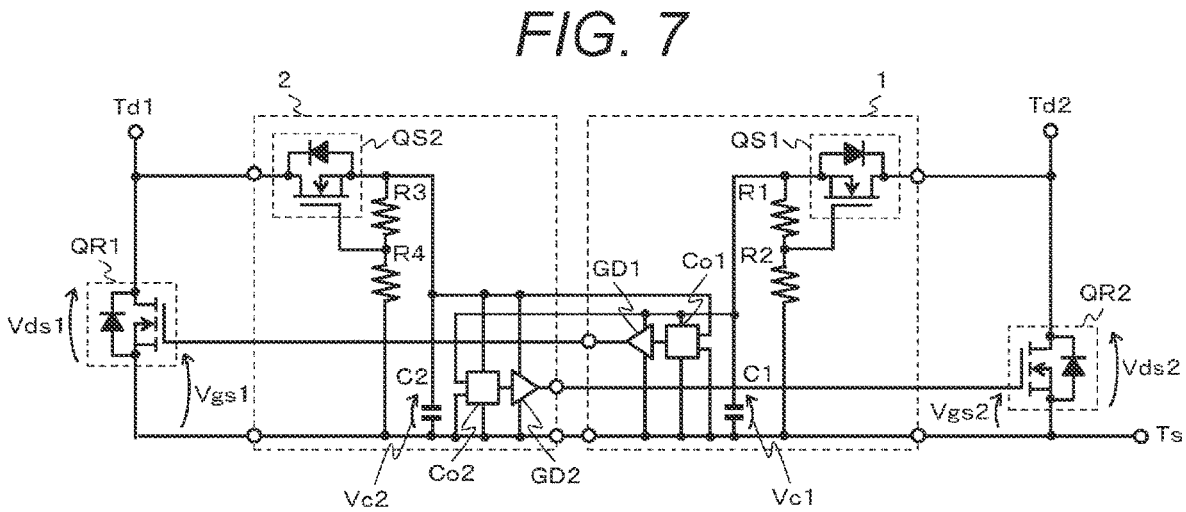
FIG. 7 is a view illustrating the structure of a rectifier circuit in a fourth embodiment of the present invention.
Figure 8:
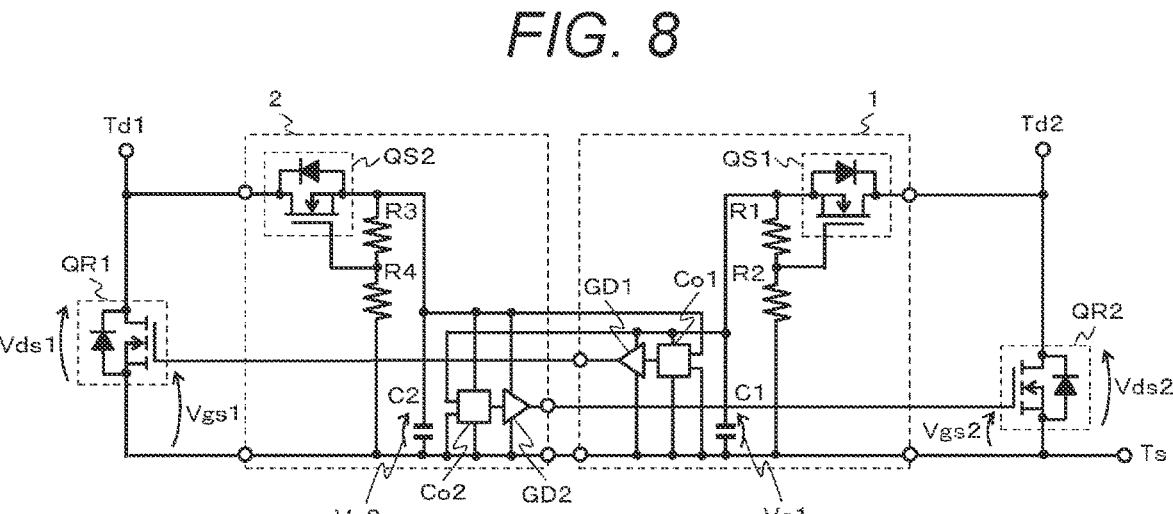
FIG. 8 is a view illustrating the structure of a rectifier circuit in a modification embodiment of the fourth embodiment of the present invention.

With reference to FIGS. 7 and 8, there will be described the structure of a rectifier circuit in a fourth embodiment of the present invention, and a method for controlling the rectifier circuit. As illustrated in FIG. 7, in the rectifier circuit in the present embodiment, in addition to the structure in the second embodiment (FIG. 4), a control circuit 1 includes a comparator Co1 and a gate driver GD1, and a control circuit 2 includes a comparator Co2 and a gate driver GD2.

Each of the rectifier circuits in the first embodiment (FIG. 1), the second embodiment (FIG. 4) and the third embodiment (FIG. 5) is assumed to be applied to a rectification bridge structured such that a resistive load is connected thereto in a subsequent stage. If each of these rectifier circuits is applied to a rectification bridge structured such that a capacitive load is connected thereto in a subsequent stage, a gate-source voltage of each rectifying MOSFET is generated in time periods other than the rectification time periods, which may cause short-circuiting between upper and lower arms.

For coping therewith, as illustrated in FIG. 7, the rectifier circuit in the present embodiment is adapted to control the time periods during which gate-source voltages are generated, using the comparators Co1 and Co2, and the gate drivers GD1 and GD2.

As an example, operations of the control circuit 1 will be described.

As illustrated in FIG. 7, in the control circuit 1, a source terminal of the MOSFET QS2 and a source terminal of the rectifying MOSFET QR1 are connected to differential input terminals of the comparator Co1, an output terminal of the comparator Co1 is connected to an input terminal of the gate driver GD1, an output terminal of the gate driver is connected to a gate terminal of the rectifying MOSFET QR1, and a source terminal of the MOSFET QS1 is connected to power supply terminals of the comparator Co1 and the gate driver GD1.

During the rectification time periods for the rectifying MOSFET QR1, the drain-source voltage of QR1 has a negative value, due to the rectified current.

At this time, the MOSFET QS1 is on and, therefore, the comparator Co1 detects a negative voltage and outputs an ON signal to the gate driver GD1, and the gate driver GD1 outputs an output voltage clamped at the threshold voltage Vref1 as the gate-source voltage Vgs1 of the rectifying MOSFET QR1.

In the aforementioned way, synchronous rectification can be realized.

The same applies to the operation of the control circuit 2.

In the rectifier circuit of FIG. 7, the positive input terminals of the comparator Co1 and the comparator Co2 are connected to the source terminals of the rectifying MOSFETs QR1 and QR2 and, therefore, the determination voltage of the comparator Co1 and the comparator Co2 is 0 V. However, the determination voltage may be also made to be a negative voltage, in order to prevent short circuiting between the upper and lower arms, when the rectifier circuit is applied to a rectification bridge to which a capacitive load is connected. Furthermore, in order to suppress chattering, which rapidly turns on and off the rectifying MOSFETs QR1 and QR2 many times, the determination voltage may be provided with hysteresis.

Further, as illustrated in FIG. 8, capacitors C1 and C2 may be used in the control circuit 1 and the control circuit 2, respectively, in order to stabilize the power supply voltages for the comparators Co1 and Co2 and the gate drivers GD1 and GD2.

The capacitors C1 and C2 used in the rectifier circuit illustrated in FIG. 8 are not required to hold energy during both on and off time periods for the rectifying MOSFETs QR1 and QR2, unlike the capacitors C1 and C2 used in the conventional rectifier circuit illustrated in FIGS. 11 and 13. This enables making the capacitances of the capacitors C1 and C2 in the present embodiment smaller than the capacitances of the capacitors C1 and C2 used in the conventional rectifier circuits of FIGS. 11 and 13.

With the rectifier circuit in the present embodiment, no gate-source voltage in the rectifying MOSFETs is generated in time periods other than the rectification time periods, which can advantageously avoid short circuiting between the upper and lower arms, in a rectification bridge structured such that a capacitive load is connected thereto in a subsequent stage.

Fifth Embodiment

Figure 9:
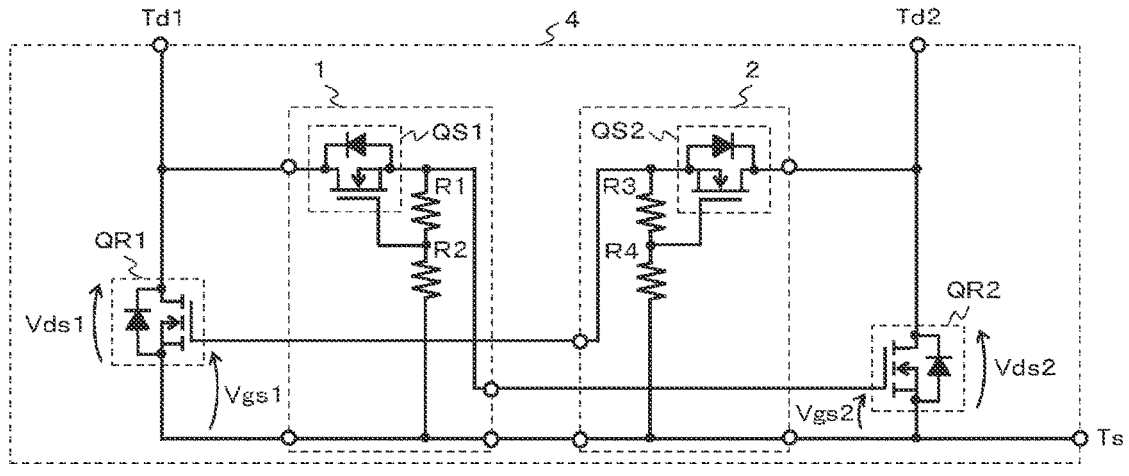
FIG. 9 is a view illustrating the structure of a semiconductor package in a fifth embodiment of the present invention.

A semiconductor package in a fifth embodiment of the present invention will be described with reference to FIG. 9. FIG. 9 illustrates the rectifier circuit described in any one of the first to fourth embodiments, which is structured to be incorporated in a semiconductor package 4.

The semiconductor package 4 includes three terminals, which are a first terminal Td1, a second terminal Td2, and a third terminal Ts, as external terminals.

FIG. 9 illustrates the rectifier circuit described in the second embodiment (FIG. 4) as an example, while the rectifier circuits described in the other embodiments may be also used therein.

There is an advantage of the present embodiment as follows. That is, in designing and fabricating a product using a rectifier circuit, by purchasing and introducing a rectifier circuit incorporating control circuits as that in the present embodiment, it is possible to eliminate the necessity of introducing control circuits themselves into designing and fabricating processes, which can reduce the number of processes required for designing and implementation.

Sixth Embodiment

There will be described a front-end power supply in a sixth embodiment of the present invention, with reference to FIG. 10. FIG. 10 illustrates an example of a power supply to which the rectifier circuits according to the present invention described in the first to fifth embodiments can be applied.

The present invention is applicable to an overall range of rectifier circuits used for power converters. For example, in the front-end power supply as illustrated in FIG. 10, the present invention can be applied thereto by being substituted for a rectifier circuit used at a position where commercial rectifying diodes CRD1 to CRD4, freewheeling diodes FWD1 and FWD2, and secondary rectifying diodes SSD1 and SSD2 are applied thereto.

Also, the rectifier circuit in any one of the first, second, and fourth embodiments may be substituted for the commercial rectifying diodes CRD3 and CRD4, and a synchronous rectifier circuit including diodes or power supply capacitors may be adopted as the commercial rectifying diodes CRD1 and CRD2.

By applying the rectifier circuit according to the present invention to a power supply such as a front-end power supply, it is possible to contribute to reduction of loss in the power supply and improvement of the reliability of the power supply.

Incidentally, the present invention is not limited to the aforementioned embodiments, and covers various modifications. For example, the aforementioned embodiments have been described in detail, for the purpose of explaining the present invention in such a way as to facilitate understanding the present invention, and the present invention is not necessarily limited to structures including all the described structures. Further, the structure in a certain embodiment can be partially replaced with the structure in another embodiment and, also, the structure in a certain embodiment can be additionally provided with the structure in another embodiment. Further, the structure in each embodiment may be partially eliminated, provided with other additional structures or replaced with other structures.

REFERENCE SIGNS LIST 1, 2 control circuit
4 semiconductor package
Td1, Td2, Ts terminal
C1, C2 capacitor
R1, R2, R3, R4 voltage dividing resistance
LQ two rectifying MOSFETs in the low side of a rectification bridge
HQ two rectifying MOSFETs in the high side of a rectification bridge
CRD1 to CRD4 commercial rectifying diode
FWD1, FWD2 freewheeling diode
SSD1, SSD2 secondary rectifying diode
QR1, QR2 rectifying MOSFET
QS1, QS2 depression type N-channel MOSFET or depression type P-channel MOSFET
Co1, Co2 comparator
GD1, GD2 gate driver
Vds1, Vds2 the drain-source voltage of the rectifying MOSFET QR1, QR2
Vgs1, Vgs2 the gate-source voltage of the rectifying MOSFET QR1, QR2
Vin input voltage
Vth1, Vth2 gate threshold voltage of the rectifying MOSFET QR1, QR2
Vth11, Vth22 gate threshold voltage of the MOSFET QS1, QS2
Vref1, Vref2 threshold voltage of the control circuit 1, the control circuit 2
Vc1, Vc2 voltage across the capacitor C1, C2
T1, T2 rectification time period for the rectifying MOSFET QR1, QR2
Vgs1, Vgs2 the gate-source voltage of the rectifying MOSFET QR1, QR2
CC1, CC2 control circuit in a conventional rectifier circuit
Rp1 to Rp4 voltage dividing resistances in a conventional rectifier circuit

The invention claimed is:

1. A rectifier circuit comprising:
a first MOSFET;
a second MOSFET;
a first control circuit; and
a second control circuit,
wherein the second MOSFET falls in a non-rectification time period when the first MOSFET falls in a rectification time period, and the first MOSFET falls in a non-rectification time period when the second MOSFET falls in a rectification time period,
during at least a part of a time period within which a voltage between a drain and a source of the second MOSFET is inputted as a first input voltage to the first control circuit, and a negative voltage is applied between a drain and a source of the first MOSFET, the first control circuit outputs a voltage generated based on the first input voltage, as a first output voltage, between a gate and the source of the first MOSFET, during at least a part of a time period within which a voltage between the drain and the source of the first MOSFET is inputted as a second input voltage to the second control circuit, and a negative voltage is applied between the drain and the source of the second MOSFET,
the second control circuit outputs a voltage generated based on the second input voltage, as a second output voltage, between a gate and the source of the second MOSFET,
the first control circuit clamps the first output voltage at a predetermined first threshold voltage when the first input voltage is a voltage equal to or larger than the first threshold voltage, and
the second control circuit clamps the second output voltage at a predetermined second threshold voltage when the second input voltage is a voltage equal to or larger than the second threshold voltage.

2. The rectifier circuit according to claim 1, wherein
the first control circuit outputs the first input voltage as the first output voltage when the first input voltage is a voltage smaller than the first threshold voltage, and
the second control circuit outputs the second input voltage as the second output voltage when the second input voltage is a voltage smaller than the second threshold voltage.

3. The rectifier circuit according to claim 1, wherein
the first control circuit includes a third MOSFET including: a drain adapted to receive the first input voltage as an input, a source connected to the gate of the first MOSFET; and a gate connected to the source of the third MOSFET itself with a first resistance interposed therebetween, and further connected to the source of the first MOSFET with a second resistance interposed therebetween, and
the second control circuit includes a fourth MOSFET including: a drain adapted to receive the second input voltage as an input, a source connected to the gate of the second MOSFET; and a gate connected to the source of the fourth MOSFET itself with a third resistance interposed therebetween, and further connected to the source of the second MOSFET with a fourth resistance interposed therebetween.

4. The rectifier circuit according to claim 1, wherein the first output voltage is a voltage smaller than a maximum value of a drain-source voltage of the second MOSFET, and the second output voltage is a voltage smaller than a maximum value of a drain-source voltage of the first MOSFET.

5. The rectifier circuit according to claim 1, wherein the first MOSFET and the second MOSFET comprise N-channel MOSFETs having respective sources connected to a DC low-voltage terminal.

6. The rectifier circuit according to claim 1, wherein the first MOSFET and the second MOSFET comprise P-channel MOSFETs having respective sources connected to a DC high-voltage terminal.

7. The rectifier circuit according to claim 1, wherein the rectifier circuit has a bridge structure, the first MOSFET and the second MOSFET in a DC low-voltage terminal side comprise N-channel MOSFETs having respective sources connected to a DC low-voltage terminal, and the first MOSFET and the second MOSFET in a DC high-voltage terminal side are P-channel MOSFETs having respective sources connected to a DC high-voltage terminal.

8. The rectifier circuit according to claim 1, wherein the first control circuit includes a first switch for clamping the first output voltage at the first threshold voltage when the first input voltage is a voltage equal to or larger than the first threshold voltage, and the second control circuit includes a second switch for clamping the second output voltage at the second threshold voltage when the second input voltage is a voltage equal to or larger than the second threshold voltage.

9. The rectifier circuit according to claim 1, wherein the first control circuit includes a first comparator and a first gate driver for controlling a time period during which the first output voltage is generated, and the second control circuit includes a second comparator and a second gate driver for controlling a time period during which the second output voltage is generated.

10. The rectifier circuit according to claim 9, wherein the first control circuit includes a first capacitor for stabilizing a voltage at a power supply terminal for the first comparator and the first gate driver, and the second control circuit includes a second capacitor for stabilizing a voltage at a power supply terminal for the second comparator and the second gate driver.

11. The rectifier circuit according to claim 1, wherein the rectifier circuit is incorporated in a single semiconductor package.

12. A power supply using the rectifier circuit according to claim 1.

* * * * *